US009412170B1

(12) United States Patent
Wu et al.

(10) Patent No.: US 9,412,170 B1
(45) Date of Patent: Aug. 9, 2016

(54) IMAGE PROCESSING DEVICE AND IMAGE DEPTH PROCESSING METHOD

(71) Applicants: LITE-ON TECHNOLOGY CORPORATION, Taipei (TW); NATIONAL TAIWAN UNIVERSITY, Taipei (TW)

(72) Inventors: Jiun-Huei Wu, Taipei (TW); Zong-Sian Li, Taipei (TW)

(73) Assignees: LITE-ON TECHNOLOGY CORPORATION, Taipei (TW); NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 14/706,090

(22) Filed: May 7, 2015

(30) Foreign Application Priority Data

Feb. 25, 2015 (TW) .............................. 104106025 A

(51) Int. Cl.
| G06K 9/34 | (2006.01) |
| G06T 7/00 | (2006.01) |
| G06T 11/60 | (2006.01) |
| G06K 9/46 | (2006.01) |
| G06F 17/30 | (2006.01) |
| G06K 9/62 | (2006.01) |

(52) U.S. Cl.
CPC .......... *G06T 7/0051* (2013.01); *G06F 17/3028* (2013.01); *G06K 9/4661* (2013.01); *G06K 9/6215* (2013.01); *G06T 7/0081* (2013.01); *G06T 11/60* (2013.01); *G06K 2009/4666* (2013.01); *G06T 2207/20144* (2013.01)

(58) Field of Classification Search
CPC ........... G06T 2207/10016; G06T 2207/20144; G06T 5/002; G06T 7/004; G06T 7/0069; H04N 5/262
See application file for complete search history.

(56) References Cited

U.S. PATENT DOCUMENTS

| 2014/0035902 A1* | 2/2014 | An ........................ G06T 7/0079 345/419 |
| 2015/0002545 A1* | 1/2015 | Webster .................. G06T 11/60 345/634 |
| 2015/0264271 A1* | 9/2015 | Yang ....................... G06T 5/002 348/239 |

* cited by examiner

*Primary Examiner* — Phuoc Tran
(74) *Attorney, Agent, or Firm* — Li & Cai Intellectual Property (USA) Office

(57) ABSTRACT

An image depth processing method includes the following steps. A background image and a foreground image in a reference image are obtained according to a depth image corresponding to the reference image. It is noted that the depth value of the background image is larger than the depth value of the foreground image. Meanwhile, the background image is blurred, and then the foreground image and a local image in the blurred background image are blurred. A simulation image is generated according to the background image and the foreground image after blurring the local image and the foreground image.

16 Claims, 5 Drawing Sheets

IMAGE PROCESSING DEVICE AND IMAGE DEPTH PROCESSING METHOD

BACKGROUND OF THE INVENTION

1. Field of the Invention

The instant disclosure relates to an image processing device and an image processing method; in particular, to an image processing device and an image processing method than can generate a simulation image having a depth of field according to a depth image and a reference image.

2. Description of Related Art

As technology develops, the volume of the smart phone or the digital camera becomes smaller and smaller, which makes them portable so the user can take photos any time. Generally speaking, the aperture of the smart phone and the digital camera is smaller, so the smart phone and the digital camera can generate a clear photo no matter whether the captured scene is far or near; however, it also makes the smart phone and the digital camera unable to generate photographic images having depth of field to emphasize a certain object.

On the other hand, the digital single lens reflex camera (DSLR) has a bigger aperture, so it can blur the image of an element not within the focal area and make another specific element within the focal area clear. However, the digital single lens reflex camera having a bigger aperture has big volume, is costly and not as portable.

Therefore, in recent years, many image depth processing methods have been applied to the smart phone and the digital camera, so as to blur part of the photographic image taken by the smart phone and the digital camera, in order to emphasize a certain element in the photographic image. However, the physics principles of geographic optics are not considered in the traditional image depth processing method, so it is hard to estimate the blurring degree of the element within and not within the focal area, which makes the blurred photographic images look not natural or not continuous.

SUMMARY OF THE INVENTION

The instant disclosure provides an image processing device and an image depth processing method based on geometric optics. The image processing device executes the image depth processing method, so that it can generate a simulation image having a depth of field that looks natural and continuous according to a reference image and a depth image corresponding to the reference image.

The instant disclosure also provides an image depth processing method. The image depth processing method comprises: each time obtaining a background image and a foreground image from a reference image according to an order indicating a depth of field shown in a depth image (from far to near), wherein the depth image corresponds to the reference image and a depth value of the background image is larger than a depth value of the foreground image; blurring the foreground image and a local image of the blurred background image that is near the margin of the foreground image; and after blurring the foreground image and the local image, forming a simulation image according to the foreground image and the background image.

In one of the embodiments of the instant disclosure, after blurring the foreground image and the local image and before forming the simulation image, the image depth processing method further comprises: executing a fading process so as to fade the margin image of the background image.

The instant disclosure also provides an image processing device, and the image processing device comprises a memory module and a processing module. The processing module is coupled to the memory module. The processing module is configured to execute the above mentioned image depth processing method. The memory module is configured to store the reference image and the depth image.

The instant disclosure further provides an image processing device, and the image processing device comprises a memory module and a processing module. The image capturing module is configured to capture an image of a scene so as to generate a plurality of photographic images. The processing module is coupled to the image capturing module, to generate a reference image according to the photographic images and to generate a depth image corresponding to the reference image. The processing module each time obtains a background image and a foreground image from a reference image according to an order indicating a depth of field shown in a depth image (from far to near), wherein a depth value of the background image is larger than a depth value of the foreground image. The processing module blurs the background image according to the depth value of the background image, and blurs the foreground image and a local image of the blurred background image that is near the margin of the foreground image according to the depth value of the foreground image. After the processing module blurs the foreground image and the local image, the processing module forms a simulation image according to the foreground image and the background image.

To sum up, via the image processing device and the image processing method provided by the embodiment of the instant disclosure, after the image processing device blurs the background image according to the depth value of the background image, the image processing device blurs the foreground image and a local image of the background image according to the depth value of the foreground image, such that the connection between the foreground image and the background image can be explained by the geometrical optics, which makes an image look natural and continuous. In addition, the image processing device can further execute a fading process, so as to fade the margin image of the background image and thereby to generate a simulation image having a depth of field and a large aperture value.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
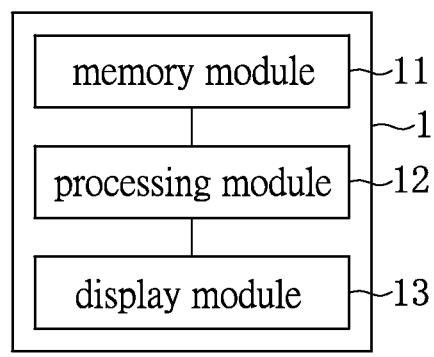
FIG. 1 shows a block diagram of an image processing device of one embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and could be termed a second element, component, region, layer or section without departing from the teachings of the instant disclosure. As used herein, the term "and/or" includes any and all combinations of one or more of the associated listed items.

Please refer to FIG. 1. FIG. 1 shows a block diagram of an image processing device of one embodiment of the instant disclosure. As shown in FIG. 1, an image processing device 1 comprises a memory module 11, a processing module 12 and a display module 13, and the processing module 12 is connected to the memory module 11 and the display module 13. In this embodiment, the image processing device 1 is a smart phone, a laptop, a personal computer, a tablet computer, a digital camera, a digital photo frame or other electric device capable of calculating and displaying, and it is not limited therein.

The memory module 11 is a storage medium, storing a reference image, a depth image (that is a gray scale image presenting the image with a gray scale range 0~255, wherein the brighter the color of the image is (the greater the gray scale is) means the nearer the position is, and vice versa) and at least an aperture simulation parameter. The depth image corresponds to the reference image. The memory module 11 is, for example, an embedded temporal memory, a physical memory or an external storage device (such as an external memory card). In one embodiment, the reference image is an image of the full depth of field having a clear foreground image and a clear background image, but it is not limited thereto. In other words, the reference image can also be an image which is partly clear. The method for generating the depth image can be realized via laser distance measurement, binocular vision, structured light or the optical field effect, which is well known by those skilled in the art and not repeated herein. The aperture simulation parameter is, for example, the shape of aperture, the size of aperture or the focal length.

The processing module 12 obtains the reference image, the depth image and the aperture simulation parameters from the memory module 11. The processing module 12 determines the depth value of each pixel in the reference image according to the depth image, and accordingly separates the reference image into a plurality of layer images having different depth values. The processing module 12 implements a blurring process for the layer images according to the depth values of the layer images and the aperture simulation parameters, so as to generate a simulation image having a larger aperture and the depth of field and the like photographed by a single lens camera. In one embodiment, the processing module 12 is an application specific integrated circuits (ASIC), a programmable microprocessor, a digital signal processor (DSP), a programmable logic device (PLD) or a CPU with a software module, and it is not limited thereto.

The display module 13 is, for example, a liquid crystal display screen that displays the reference image for a user to click any position of the reference image. Thereby, the processing module determines the reference depth value according to the depth value of the pixel corresponding to the click position. It should be noted that, the display module 13 can also be a digital display screen with the touch-sensing function or other general digital display screen, and it is not limited therein. In this embodiment, the user can click any position of the reference image via a mouse, a keyboard or other input module, such that the processing module 12 determines a reference depth value according to the depth value of the pixel corresponding to the clicked position. The user can also directly input a value via the input module, and the processing module 12 can use the input value as the reference depth value, but is not limited therein.

In this embodiment, after the processing module 12 determines a reference depth value, the processing module 12 calculates the differences between the depth value of each layer image and the reference depth value, and determines the blurring degrees of the layer images according to the differences. Moreover, the processing module 12 makes the display module 13 display different aperture shapes for the user to choose according to the aperture simulation parameter. After that, after the user chooses an aperture shape via a display module 13 with the touch-sensing function, a mouse, a keyboard or other input modules, the processing module 12 generates a simulation image having a specific Bokeh shape (such as the star-shaped, heart-shaped, circle, pentagon or other shapes) according to the aperture shape. It should be noted that, if the user does not choose an aperture shape, the processing module 12 would automatically load in a predetermined aperture simulation parameter so as to generate a simulation image of which the Bokeh shape is like a circle Gaussian function.

In addition, the way for the image processing device 1 to obtain the reference image and the depth image is that, the user saves the reference image and the corresponding depth image in the memory module 11 in advance, but it is not limited herein. In other words, the image processing device 1 can also generate the reference image and the depth image itself. In detail, the image processing device 1 comprises an image capturing module (not shown), and the image capturing module is connected to the processing module 12. The image capturing module comprises a lens, a light-sensing element and an aperture, which is used to capture images of a scene so as to generate a plurality of photographic images. The light-sensing element is, for example, a charge coupled device (CCD) or a complementary metal-oxide semiconductor (CMOS). In this embodiment, the processing module 12 generates the reference image and the depth image according to the photographic images. It should be noted that, how the processing module 12 generates the reference image and the corresponding depth image according to the photographic images is well-known by those skilled in the art, and not repeated herein.

Figure 2:
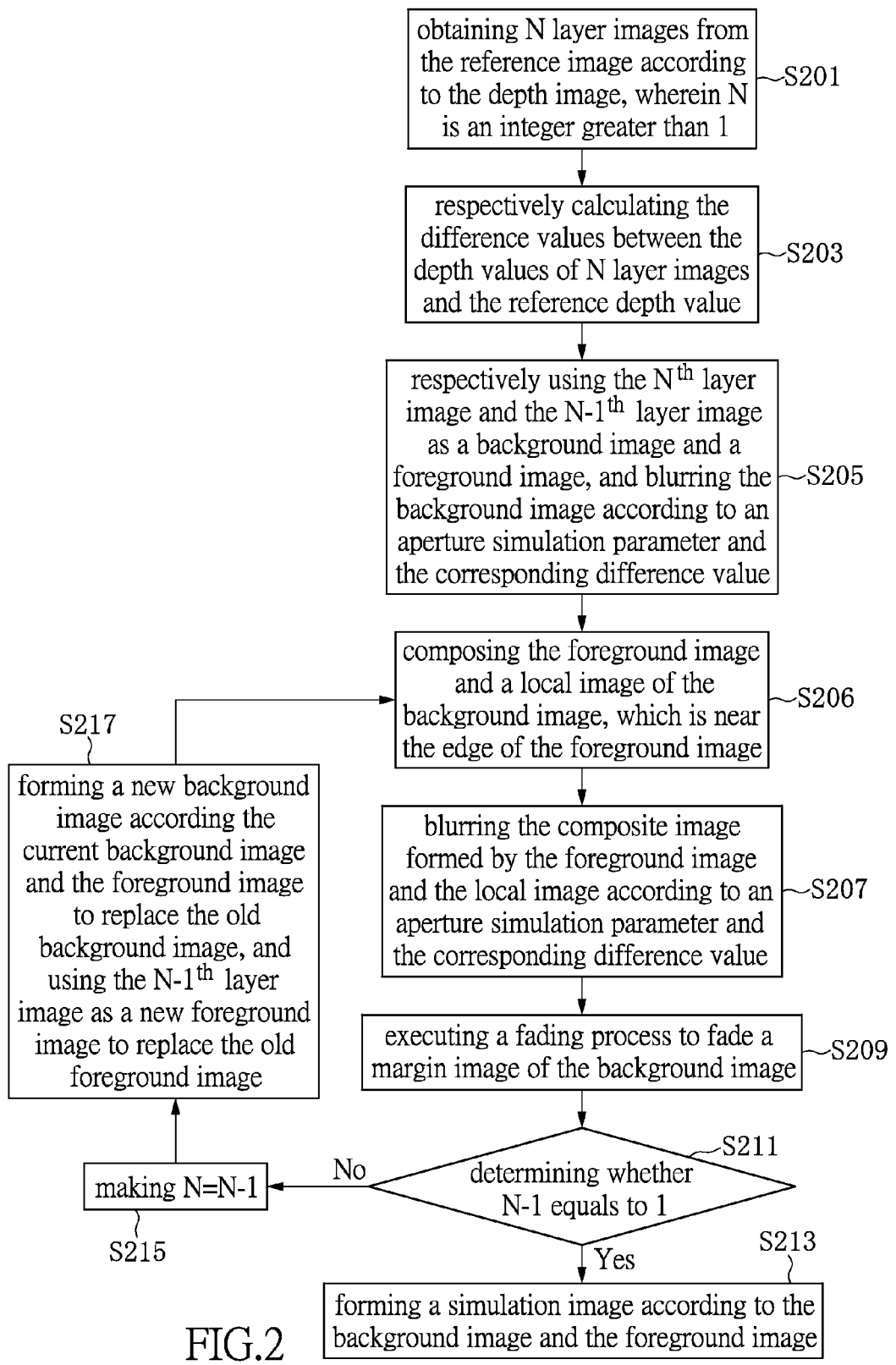
FIG. 2 shows a flow chart of an image depth processing method of one embodiment of the instant disclosure.
Figure 3:
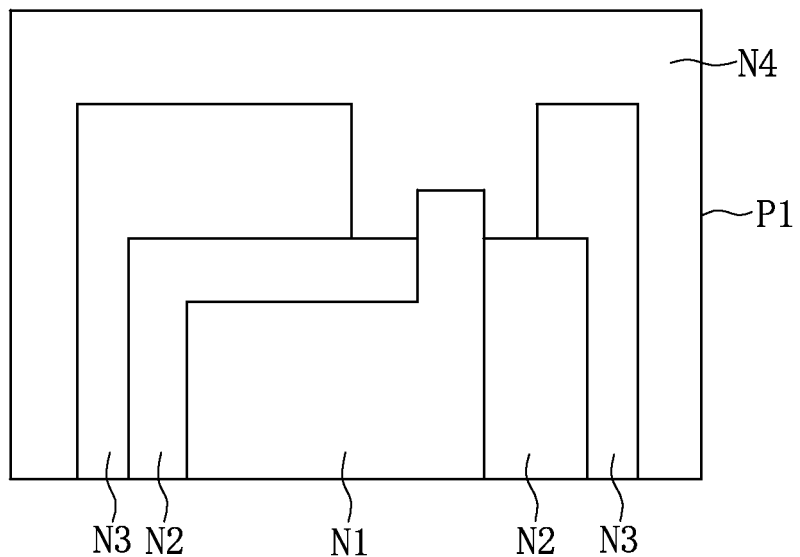
FIG. 3 shows a reference image stored in a memory module of the image processing device.

Please refer to FIGS. 1-3. FIG. 2 shows a flow chart of an image depth processing method of one embodiment of the instant disclosure, and FIG. 3 shows a reference image stored in a memory module of the image processing device. The image depth processing method can be applied to the image processing device 1 shown in FIG. 1, and can generate a simulation image having a larger aperture and the depth of field and like photographed by a single lens camera according to the reference image shown in FIG. 3. Thus, the image depth processing method in this embodiment is described as follows via the image processing device 1 shown in FIG. 1 and the reference image shown in FIG. 3. It should be noted that, the reference image shown in FIG. 3 is merely for describing the working principle of the image depth processing method, which does not mean that the image depth processing method merely can be applied to the reference image shown in FIG. 3. In other words, the image depth processing method can generate simulation images according to other reference images.

In Step S201, the processing module 12 obtains N layer images from the reference image according to the depth value shown in the depth image (from far to near), wherein N is an integer greater than 1 and the depth values of the layer images are different. As shown in FIG. 3, the processing module 12 obtains four layer images from the reference image P1 according to the depth image corresponding to the reference image P1, which is a first layer image N1, a second layer image N2, a third layer image N3 and a fourth layer image, wherein the higher the layer number of the layer image is, the greater the depth value of the layer image would be (further depth of field). It should be noted that, before the processing module 12 obtains N layer images from the reference image, the user can set the value of N via the display module 13 having touch-sensing function, a mouse or a keyboard to further set the numbers of layer images and the numbers of re-focus, wherein N can be a predetermined value.

In Step S203, after the user chooses a reference depth value via a display module 13 having the touch-sensing function, a mouse or a keyboard, the processing module 12 respectively calculates the differences between the depth values of the layer images and the reference depth value, so as to obtain the difference values corresponding to each layer image. The processing module 12 determines the simulation degree of each layer image according to the difference values, wherein if the difference value is large the blurring degree of the layer image would be large. Also, the memory module 11 stores a look-up table (not shown), and the look-up table records a plurality of blurring parameters. Assuming that the user clicks the first layer image N1 via the display module 13 having the touch-sensing function, the processing module 12 would use the depth value of the first layer image N1 as the reference depth value, and respectively calculate difference values between the depth values of the layer images and the reference depth value so as to correspondingly obtain the first, the second, the third and the fourth difference values. The processing module 12 obtains the corresponding blurring parameters from the look-up table according to the difference values, and then determines the blurring degree of each layer image according to the blurring parameters.

In Step S205, the processing module 12 uses the $N^{th}$ layer image having the greatest depth value as a background image (such as the fourth layer image N4), and uses the $N-1^{th}$ layer image as a foreground image (such as the third layer image N3 wherein the depth value of the $N-1^{th}$ layer image is smaller than the $N^{th}$ layer image. After that, the processing module 12 blurs the background image according to the predetermined aperture simulation parameter (or the aperture simulation parameter chosen by the user) and the corresponding difference value of the $N^{th}$ layer image.

Figure 4:
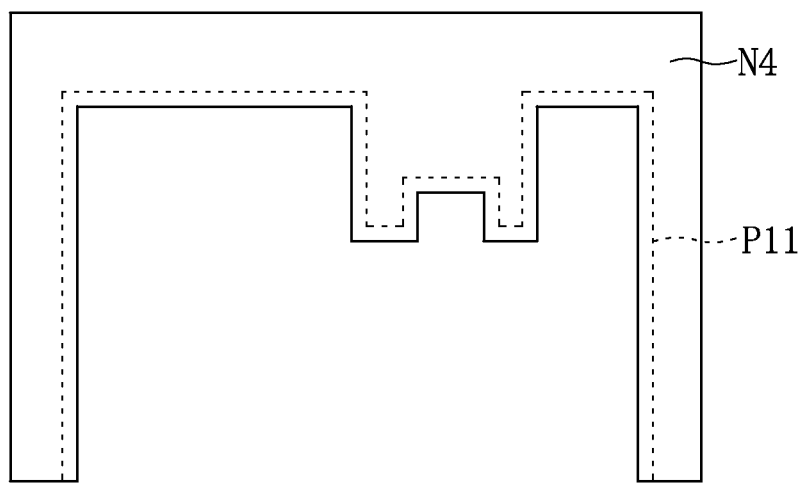
FIG. 4 shows a schematic diagram of a background image obtained according to the reference image shown in FIG. 3.

In Step S206, the processing module 12 composes the foreground image and a local image in the blurred background image, which is near the edge of the foreground image. Please refer to FIG. 4. FIG. 4 shows a schematic diagram of a background image obtained according to the reference image shown in FIG. 3. In this step, the processing module 12 obtains a local image P11 from the fourth layer image N4, and the local image P11 corresponds to a part of the fourth layer image N4, which is near the edge of the third layer image N3. The processing module 12 composes the local image P11 and the third layer image N3 into a composite image.

In Step S207, the processing module 12 blurs the composite image formed by the foreground image and the local image of the background image, such that the depth of field across from the fourth layer image N4 to the third layer image N3 would look continuous and natural.

Figure 5:
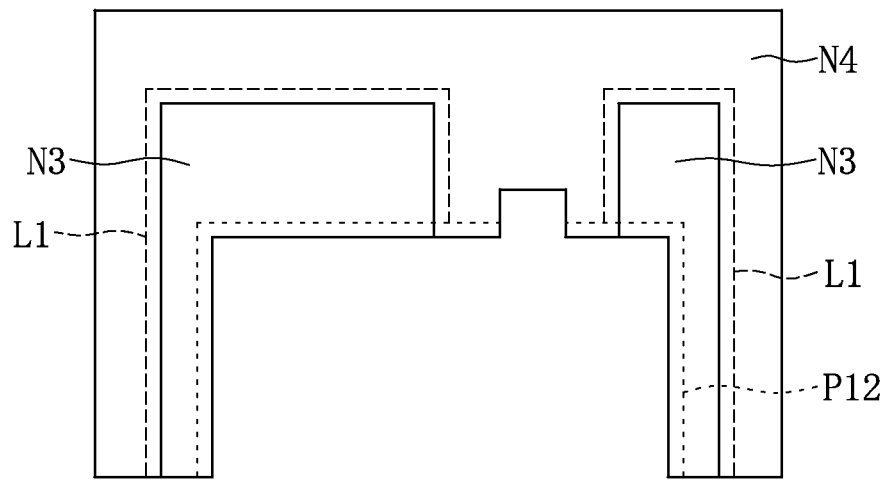
FIG. 5 shows a schematic diagram of another background image obtained according to the reference image shown in FIG. 3.

In Step S209, after Step S207 the blurring degree of the local image and the blurring degree of the background image are different, so there would be a margin image existed in the background image. Thus, in this step, the processing module 12 implements a fading process to fade a margin image in the background image. Please refer to FIG. 5. FIG. 5 shows a schematic diagram of another background image obtained according to the reference image shown in FIG. 3. As shown in FIG. 5, after Step S207, the blurring degree of the local image P11 and the blurring degree of the fourth layer image N4 are different, and thus there would be a margin image L1 existed in the fourth layer image N4. Therefore, in this step, the processing module 12 would fade in the fourth layer image N4 along the margin image L1 (that is, to make the fourth layer image N4 near the margin image L1 gradually clear) and fade out the local image P11 along the margin image L1 (that is, to make the local image P11 of the margin image L1 gradually blur), so as to fade the margin image L1.

In Step S211, the processing module 12 determines whether (N−1) equals to 1. If yes, it goes to Step S213 to form a simulation image according to the current background image and foreground image. If no, it goes to Step S215 to subtract 1 from N and then it goes to Step S217.

In Step S217, the processing module 12 forms a new background image according to the current background image and foreground image to replace the old background image, and uses the $N-1^{th}$ layer image as a new foreground image to replace the old foreground image. After Step S215, N is 3 (that is, N=4−1), and thus the processing module 12 uses the second layer image N2 as a new foreground image, and forms a new background image according to the fourth layer image N4 and the third layer image N3 which are processed by Steps S203~S209 (as shown in FIG. 5).

After Step S217, the processing module 12 again implements Step S206 to compose the foreground image (that is, the second layer image N2) and a local image of the background image (that is, a local image P12 of the background image, which is near the edge of the second layer image N2) into a composite image.

After that, the processing module 12 implements Step S207 to blur the composite image generated in Step S206, according to the aperture simulation parameter and the depth value corresponding to the second layer image N2.

Figure 6:
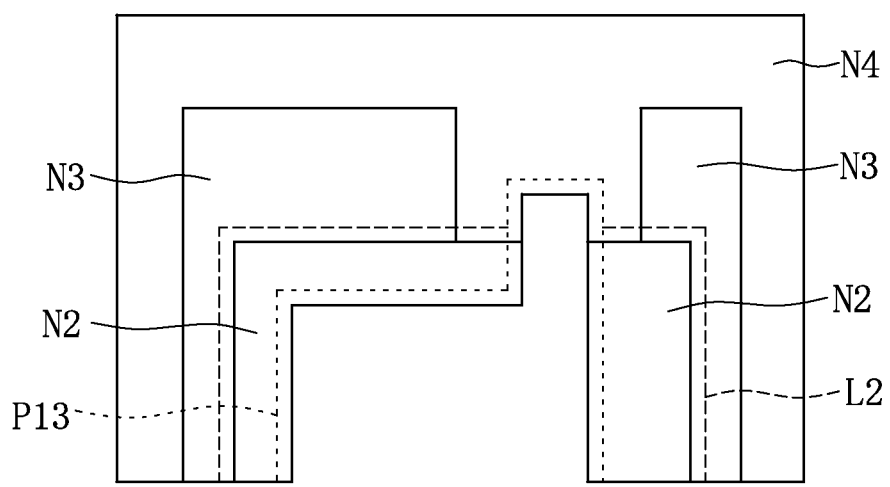
FIG. 6 shows a schematic diagram of still another background image obtained according to the reference image shown in FIG. 3.

Please refer to FIG. 6. FIG. 6 shows a schematic diagram of still another background image obtained according to the reference image shown in FIG. 3. As shown in FIG. 6, after Step S207, there would be a margin image L2 existing in the background image, and thus the processing module would again execute Step S209 so as to fade in the background image (that is, to make the background image of the margin image L2 gradually clear) and to fade out the local image P12 along the margin image L2 (that is, to make the local image P12 of the margin image L2 gradually blur), so as to fade the margin image L2.

After that, the processing module 12 again executes Step S211 to determine that (N−1) is not equal to 1 (that is, N−1=2). In addition, the processing module 12 again executes Step S217 to use the first layer image N1 as a new foreground image and to form a new background image according to the background image and foreground image processed via Steps S207~S209 (as shown in FIG. 6).

After that, the processing module 12 again executes Step S206 to compose the foreground image (that is, the first layer image N1) and a local image of the background image (that is, a local image P13 of the background image, which is near the edge of the first layer image N1) into a composite image.

After that, the processing module 12 executes Step S207 and Step S209 to blur the composite image generated in Step S206 according to the aperture simulation parameter and the corresponding depth value of the first layer image N1. The processing module 12 fades in the background image along a margin image (not shown) in the background image and fades out the local image P13 along the margin image, so as to fade the margin image.

Figure 7:
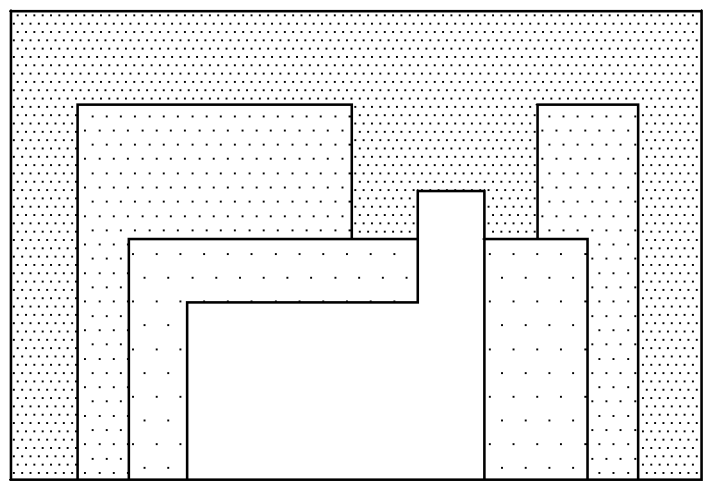
FIG. 7 shows a schematic diagram of a simulation image generated according to the reference image shown in FIG. 3.

After that, the processing module 12 again executes Step S211 to determine whether N−1 is equal to 1 (that is, 2−1=1), and then executes Step S213 to generate a simulation image. Specifically, when N−1 equals to 1, all of the layer images have been processed. Therefore, please refer to FIG. 7, FIG. 7 shows a schematic diagram of a simulation image generated according to the reference image shown in FIG. 3. As shown in FIG. 7, the processing module generates a simulation image having a larger aperture and the depth of field like photographed by a single lens camera according to the current background image and foreground image.

From the above, after the image processing device 1 blurs the background image, the image processing device 1 would blur the foreground image according to the difference value corresponding to the foreground image and the aperture simulation parameters, and the image processing device 1 would also blur a local image of the background image according to the difference value corresponding to the foreground image and the aperture simulation parameters. After that, the image processing device 1 implements a fading process along a margin image in the background image, so as to generate a simulation image satisfied with the physics principles of geometrical optics so that the simulation image would have the graduated depth of field and look natural and continuous.

Moreover, the depth value of the first layer image N1 is taken as the reference depth value in the above embodiment to generate a simulation image having near depth of field, but it is not limited herein. In other words, the image processing device 1 can also take the depth value of other layer images as the simulation image according to the position clicked by the user so as to generate a simulation image having other kinds of depth of field. However, it should be noted that, no matter which layer image the image processing device 1 takes the depth value of as the reference depth value, the image processing device 1 processes images in an order from the layer image having the greatest depth value to the layer image having the smallest depth value during the image process (that is, from the farthest layer image to the nearest layer image), so as to generate a simulation image satisfying the physics principles of geometrical optics.

Additionally, in another embodiment, before the image processing device 1 blurs the layer images, the image processing device 1 would increase the image brightness value of at least one bright area in the reference image P1. Specifically, there may be images of a bright area in the reference image P1, such as a light-concentrating point or reflective surface. Usually, the image of the bright area has the greatest brightness which is 255 (the brightness of the general images ranges from 0 to 255). However, the brightness of the image of the bright area is usually presented as 255, so if the reference image P1 is blurred without increasing the brightness of the image of the bright area in advance, the brightness of the image of the bright area of the blurred reference image P1 would decrease. Thereby, the simulation image generated by the image processing device 1 would not satisfy the principles of optics. Therefore, before the image processing device 1 executes Step S205, the image processing device 1 would increase the brightness of the image of the bright area in advance (for example, from 255 to 500), so as to prevent decreasing the brightness of the image of the bright area during the process of blurring each layer image. However, it is not limited herein, and those skilled in the art could choose to skip this step based on need.

It should be also mentioned that, the image depth processing method can be applied to still images and also to simulated dynamic images (that is, animation) to have depth of field, but is not limited herein.

It is clarified that, the sequence of steps in FIG. 2 is set for a need to instruct easily, but the sequence of the steps is not used as a condition for demonstrating embodiments of the instant disclosure.

To sum up, the image processing device and the image depth processing method allow the user to set the numbers of layer images and the numbers of re-focus, to simulate the depth of field of any practical lens according to the aperture simulation parameters and also to increase the brightness of the image of the bright area in advance so as to strengthen at least one image of the bright area of the simulation image. In the image processing device and the image depth processing method, via blurring the foreground image and blurring a local image of the background image, which is near the edge of the foreground image, and implementing a fading process to fade the margin image in the background image, it a simulation image can be generated that satisfies the physics principles of geographic optics (that is, a simulation image having graduated depth of field, which looks natural and continuous).

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An image depth processing method, comprising:
    step (a): obtaining a background image and a foreground image from a reference image according to a depth image, wherein the depth image corresponds to the reference image and a depth value of the background image is larger than a depth value of the foreground image;
    step (b): blurring the background image according to the depth value of the background image;
    step (c): blurring the foreground image and a local image of the blurred background image according to the depth value of the foreground image; and
    step (d): after blurring the local image of the blurred background image, forming a simulation image according to the foreground image and the background image.

2. The image depth processing method according to claim 1, wherein step (b) further comprises:
    calculating a first difference value between the depth value of the background image and a reference depth value; and
    determining a blurring degree of the background image according to the first difference value.

3. The image depth processing method according to claim 1, wherein step (c) further comprises:
   calculating a second difference value between the depth value of the foreground image and a reference depth value; and
   determining a blurring degree of the foreground image according to the second difference value.

4. The image depth processing method according to claim 1, wherein after step (c) and before step (d), the method further comprises:
   executing a fading process to fade a margin image of the background image.

5. The image depth processing method according to claim 1, wherein after step (c) and before step (d), the method further comprises:
   executing a fading process to fade in the background image and to fade out the local image along a margin image of the background image, so as to fade the margin image.

6. The image depth processing method according to claim 1, wherein before blurring the background image and the foreground image, the method further comprises:
   increasing an image brightness value of at least one bright area in the reference image.

7. The image depth processing method according to claim 1, further comprising:
   simulating a Bokeh shape of the simulation image according to an aperture simulation parameter.

8. The image depth processing method according to claim 1, wherein the local image corresponds to a part of the background image and the part of the background image is near a margin of the foreground image.

9. The image depth processing method according to claim 1, wherein before step (a), the method further comprises:
   forming N layer images according to the depth image and the reference image, wherein N is an integer greater than 1 and depth values of the layer images are different; and
   choosing a $N^{th}$ layer image and a $N-1^{th}$ layer image among the layer images as the background image and the foreground image respectively, wherein a depth value of the $N^{th}$ layer image is larger than a depth value of the $N-1^{th}$ layer image.

10. The image depth processing method according to claim 9, wherein before step (d), the method further comprises:
    when N−1 does not equal to 1, subtracting 1 from N;
    forming another background image to replace the background image according to the foreground image and the background image;
    choosing a $N-1^{th}$ layer image among the layer images as another foreground image to replace the foreground image; and
    again executing step (b) and step (c).

11. The image depth processing method according to claim 1, wherein before step (c), the method further comprises:
    composing the foreground image and the local image.

12. An image processing device, comprising:
    a processing module, for executing the image depth processing method according to claim 1; and
    a memory module, coupled to the processing module, storing the reference image and the depth image.

13. The image processing device according to claim 12, further comprising:
    an input module, coupled to the processing module, provided to a user for choosing an aperture simulation parameter, wherein the aperture simulation parameter is stored in the memory module and the processing module simulates a Bokeh shape of the simulation image according to the aperture simulation parameter.

14. The image processing device according to claim 13, wherein the user chooses a reference depth value via the input module, the processing module calculates a first difference value between the depth value of the background image and a reference depth value, so as to determine a blurring degree of the background image, and the processing module calculates a second difference value between the depth value of the foreground image and a reference depth value, so as to determine the blurring degree of the foreground image and the local image.

15. The image processing device according to claim 12, wherein after the processing module blurs the background image and the foreground image, the processing module executes a fading process to fade a margin image of the background image.

16. A image processing device comprising:
    an image capturing module, for capturing an image of a scene, so as to generate a plurality of photographic images; and
    a processing module, coupled to the image capturing module, generating a reference image according to the photographic images and generating a depth image corresponding to the reference image, the processing module obtaining a background image and a foreground image from the reference image according to the depth image, wherein a depth value of the background image is larger than a depth value of the foreground image;
    wherein the processing module blurs the background image according to the depth value of the background image, and blurs the foreground image and a local image of the blurred background image, and after the processing module blurs the foreground image and the local image, the processing module forms a simulation image according to the foreground image and the background image.

* * * * *